Dec. 11, 1956   B. WALKER   2,773,719
REAR FENDER COMPARTMENT FOR SPARE TIRE
Filed Oct. 11, 1952

INVENTOR.
Brooks Walker

United States Patent Office 2,773,719
Patented Dec. 11, 1956

2,773,719

REAR FENDER COMPARTMENT FOR SPARE TIRE

Brooks Walker, Piedmont, Calif.

Application October 11, 1952, Serial No. 314,265

7 Claims. (Cl. 296—37.2)

This invention pertains to an improvement in a motor vehicle and particularly to an improved compartment within the portion of the rear fender rearwardly of the rear wheel or in the portion of the vehicle body rearwardly of the rear wheel; said compartment being accessible by opening a portion of the rear fender; the locking of the rear fender in place being accomplished from a hood lock type of control preferably operated from within the normal rear luggage compartment, thus eliminating additional means of locking the spare tire when located in said compartment other than the rear deck lock. Such rear fender compartment will, in general, be outside the regular frame section extending inside and rearwardly of the rear tires.

This compartment may be adapted to receive a spare tire, battery, luggage, etc. In previous constructions the spare tire has generally been located in the luggage compartment or at the exterior of the vehicle. This construction allows the space at the rear of the rear wheels to be used to carry the spare tire or luggage and provides access by opening the fender somewhat like a hood opens to provide access to the spare tire and wheel in this compartment. It allows ready means of removing the rear fenders for replacement or repair in case of fender damage. It also allows the rear fenders to come down over the rear wheels without needing wheel "pants" as now used on Cadillacs and other modern automobiles. These removable rear fenders allow ready access for changing rear tires and wheels, working on rear brakes, springs and putting on chains. To install chains on present cars where the fenders almost cover the rear wheels and the fenders are not removable is very difficult, compared to the ease of attaching tire chains with this invention, after the fenders have been opened or removed.

Other features of this invention will be more particularly pointed out in the attached specifications and claims.

I have shown my invention in the accompanying drawing in which Fig. 1 shows a side elevation of the rear portion of a vehicle incorporating this invention.

On all views like numerals of reference refer to corresponding parts.

Figure 1:
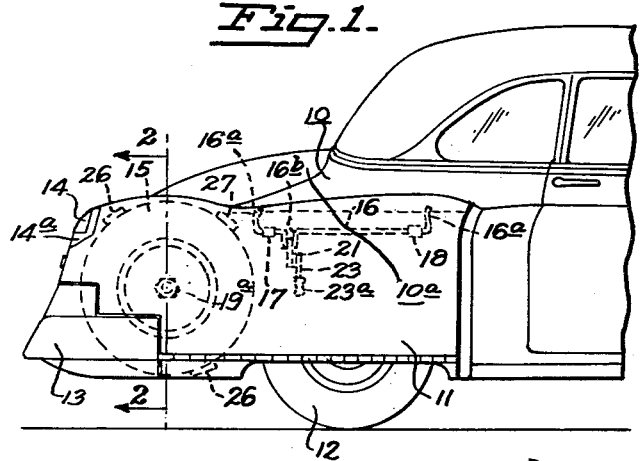
Figure 2:
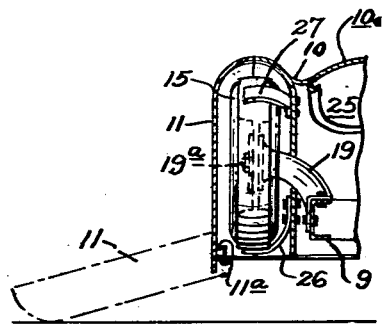
Fig. 2 is a sectional view from the front of the vehicle of one rear corner of the vehicle taken at section 2—2 of Fig. 1.
Figures 3, 5:
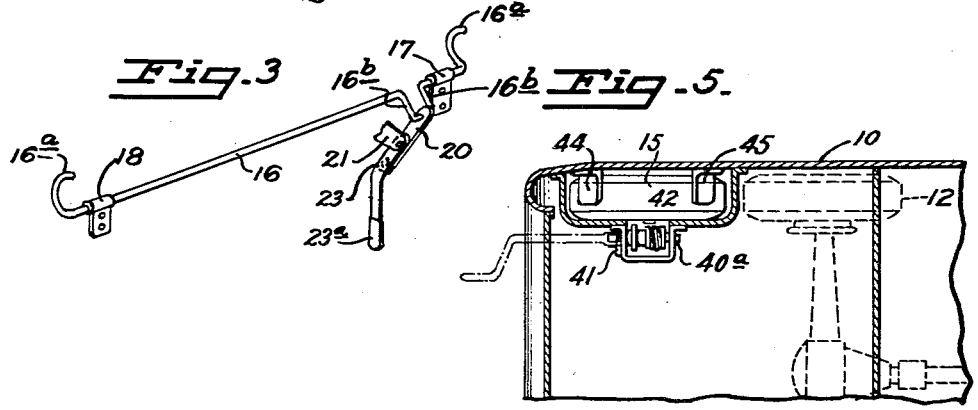
Fig. 3 is a perspective view of one form of fender locking mechanism such as is shown in Figs. 1 and 2.
Fig. 5 is a plan view of a portion of the vehicle incorporating the modified form of Fig. 4.

On Figs. 1, 2, and 3 we show a vehicle body 10 having a rear wheel fender 11, a rear bumper 13, a tail light 14, a spare tire 15 mounted on bracket 19 by bolt 19a. Bracket 19 is in turn mounted on the car frame 9 or other suitably rigid portion of the body, possibly just a slight recess to fit the tire in the metal wall between the luggage compartment 25 and the rear fender spare tire compartment or by bolting the tire against brackets that fit the spare tire such as brackets 26 and 27.

The rear fender 11 of this car is hinged at its lower edge like a Cadillac fender "pants" at a point near the front edge of the rear bumper 13 and near the lower rear corner of the rear body door or at a point preferably forward of the rear wheel. The top of the fender is engaged by two or more clamps such as 16a of fender lock rod 16 and held in locked position by past center toggle 23 and handle 23a which are pivoted to the car body 10 by bracket 21. Link 20 ties toggle arm 23 to crank 16b of shaft 16. When handle 23a is raised after unlocking and opening the luggage compartment door 10a, the right rear fender 11 will be unlocked along its upper edge adjacent to body 10 and free to be lowered toward the ground as shown in Fig. 2 or removed completely from the vehicle. The tail light 14 is preferably attached to the body 10 with a lower edge 14a adapted to engage and disengage said rear fender 11. When fender 11 is swung about its pivots 11a at the lower forward and rearward edges of the fender 11 the pivots 11a can be disconnected for removal of fender 11 from body 10. The spare tire can then be easily removed and the rear tire can also be easily accessible for changing, working on or near the rear tire and wheel, putting on tire chains, etc.

Figure 4:
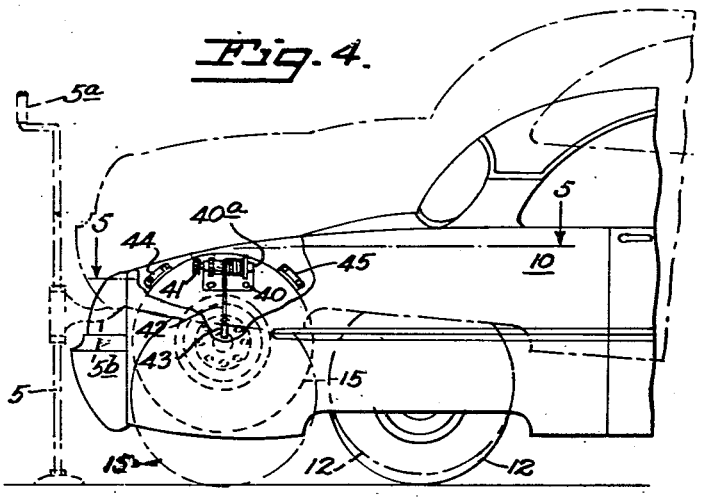
Fig. 4 is a side elevation of the rear portion of a vehicle showing a modified form of the invention.

In Figs. 4 and 5 I have shown a further form of the invention wherein the spare tire 15 is raised by winch 40 from under the rear fender when the car is raised on a garage jack or bumper jack such as 5 with crank 5a and bumper engager 5b. Winch 40 carries a cable 42 with a hook 43 for engaging the hub circle of the spare wheel or one of the wheel bolt holes. This winch may be operated by a wheel lug wrench by shaft 40a having a hexagonal head 41 similar to the wheel bolt heads. A suitable ratchet holds the tire in place or when released allows the winch to lower the spare. The winch is preferably operated from within the luggage compartment and not operable unless the luggage compartment door is open. When the tire is raised it is pulled firmly against brackets 44 and 45 to securely hold the spare in position.

Where the term luggage compartment has been used, it is understood that with rear engine design the compartment could house the engine with or without luggage.

I do not wish in any way to limit myself to the exact details or mode of operation set forth in the specifications and drawings without departing from the spirit and scope of my invention which is set forth in the following claims.

I claim as my invention:

1. A vehicle having a body, rear wheels, a passenger compartment, a portion of said body covering said rear wheels and forming a compartment in back of said rear wheels, said compartment adapted to carry a spare tire substantially vertically and substantially in line with one of said rear wheels, access to said compartment being from under said second compartment, a winch, a compartment at the rear of the vehicle and rearwardly of the passenger compartment and accessible through a central rear hinged door, the operating control for said winch being located within and accessible through said hinged door, said spare tire supported by said winch.

2. A vehicle having a body, rear wheels, a portion of said body covering one said rear wheel and forming a compartment in back of said rear wheel, said compartment adapted to carry a spare wheel substantially vertically and substantially in line with said one rear wheel, access to said compartment being from under said compartment, manually operated means to raise said spare wheel into said compartment from below, manually adjustable means for holding said spare wheel in a raised position within said compartment.

3. A vehicle having a body, rear wheels, a portion of said body covering one said rear wheel and forming a first compartment in back of said one rear wheel, said first compartment being provided with a bottom opening, a winch in said first compartment for supporting therein an inflated spare tire and rim assembly substantially vertically and substantially in line with said one of said rear wheels, said winch being adapted to raise and lower said tire and rim assembly through said bottom opening, a second compartment located largely rearwardly and between said rear wheels, a centrally located door at the rear of said vehicle, said door providing access only to said second compartment, and a partition separating said first compartment from said second compartment, said winch having its operating means in said second compartment, whereby said spare tire can be raised and lowered only by said winch and only when said second compartment door is open.

4. A vehicle having a body, rear wheels, a passenger compartment, a portion of said body covering one of said rear wheels and forming a second compartment in back of said one rear wheel, said second compartment being adapted to carry a spare wheel substantially vertically and substantially in line with said one rear wheel, access to said second compartment being from under said second compartment, a winch, a third compartment at the rear of the vehicle and rearwardly of the passenger compartment accessible through a central rear hinged door, said winch being located within and accessible through said third compartment, a wall between and separating said second and third compartments, said spare wheel being supported on said winch when in its said second compartment.

5. A vehicle having rear wheels, a body provided with doors, a portion of said body covering one of said rear wheels and forming a spare wheel compartment with a bottom opening in back of said one rear wheel, a winch adapted to hold a spare wheel in said compartment vertically and substantially in line with said one rear wheel and to raise and lower said wheel through said bottom opening, and control means for said winch accessible when a particular said door is open.

6. The vehicle of claim 5, wherein said particular door is in the rear end wall of said body.

7. A vehicle having a body, rear wheels, a portion of said body covering one of said rear wheels and forming a first compartment in back of said one rear wheel and having an open bottom portion, a winch supporting a spare wheel in said first compartment substantially vertically and substantially in line with said one rear wheel, a second compartment adjacent said first compartment and separated therefrom at the rear of the vehicle and accessible through a central rear hinged door, and an operating control for said winch located within said second compartment and accessible when said hinged door is opened.

References Cited in the file of this patent

UNITED STATES PATENTS

| | | |
|---|---|---|
| 1,596,212 | Newell et al. | Aug. 17, 1926 |
| 1,988,346 | Wagner | Jan. 15, 1935 |
| 1,990,757 | Stiles | Feb. 12, 1935 |
| 2,028,945 | Morrison | Jan. 28, 1936 |
| 2,063,598 | Franklin | Dec. 8, 1936 |
| 2,251,970 | Avery et al. | Aug. 12, 1941 |
| 2,688,372 | Walker | Sept. 7, 1954 |
| 2,700,572 | Torrance | Jan. 25, 1955 |

FOREIGN PATENTS

| | | |
|---|---|---|
| 629,724 | France | Aug. 2, 1927 |
| 862,442 | France | Dec. 9, 1940 |
| 631,921 | Great Britain | Nov. 11, 1949 |